US011463521B2

(12) United States Patent
White et al.

(10) Patent No.: US 11,463,521 B2
(45) Date of Patent: Oct. 4, 2022

(54) DYNAMIC CONNECTIVITY MANAGEMENT THROUGH ZONE GROUPS

(71) Applicant: DELL PRODUCTS L.P., Round Rock, TX (US)

(72) Inventors: Joseph LaSalle White, San Jose, CA (US); Erik Smith, Douglas, MA (US); Claudio Desanti, Santa Cruz, CA (US); Pawan Singal, Milpitas, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/194,251

(22) Filed: Mar. 6, 2021

(65) Prior Publication Data

US 2022/0286507 A1 Sep. 8, 2022

(51) Int. Cl.
*G06F 15/173* (2006.01)
*H04L 67/1097* (2022.01)
*H04L 41/0803* (2022.01)

(52) U.S. Cl.
CPC ...... *H04L 67/1097* (2013.01); *H04L 41/0803* (2013.01)

(58) Field of Classification Search
CPC ............ H04L 67/1097; H04L 41/0803
See application file for complete search history.

(56) References Cited

U.S. PATENT DOCUMENTS

| | | | | |
|---|---|---|---|---|
| 2009/0006501 | A1* | 1/2009 | Bharadwaj | .......... H04L 67/1097 |
| 2013/0304951 | A1* | 11/2013 | Goel | ..................... G06F 3/0607 |
| | | | | 710/65 |
| 2018/0074717 | A1 | 3/2018 | Olarig | |
| 2018/0081558 | A1* | 3/2018 | Ish | ........................ G06F 3/0688 |
| 2018/0270119 | A1 | 9/2018 | Ballapuram | |
| 2019/0245924 | A1 | 8/2019 | Li | |

(Continued)

OTHER PUBLICATIONS

"Fibre Channel," Generic Services—7 (FC-GS-7), [online], [Retrieved Feb. 17, 2022], Retrieved from Internet <URL: https://standards.incits.org/apps/group_public/download.php/81982/T11-2016-300v0.pdf> INCITS working draft proposed American National Standard for Information Technology, 2016. (397pgs).

(Continued)

*Primary Examiner* — Yves Dalencourt
(74) *Attorney, Agent, or Firm* — North Weber & Baugh LLP

(57) ABSTRACT

To address concerns with administration of zones in storage area network (SAN) environments, presented are embodiments of a "zone group," including systems and methods for configuring, implementing, and managing such. While zone group embodiments may comprise one or more zones, unlike traditional zone sets, a zone group includes additional features. For example, a zone group includes an "Owner" and also allows for multiple zone groups to be active on a fabric at one time. By adding the concept of an owner to a zone group, changes made by a user or entity impact the zone group to which the owner has rights to access or modify. Also, by allowing multiple zone groups to be active at the same time, embodiments enable multiple administrators or entities to make unrelated modifications to connectivity and dramatically reduce the impact of unintentional changes. Additional features and benefits are described herein.

20 Claims, 23 Drawing Sheets

(56) References Cited

U.S. PATENT DOCUMENTS

| | | |
|---|---|---|
| 2020/0065269 A1 | 2/2020 | Balasubramani |
| 2020/0081640 A1 | 3/2020 | Enz |
| 2020/0310657 A1 | 10/2020 | Cayton |
| 2020/0319812 A1 | 10/2020 | He |
| 2020/0349094 A1 | 11/2020 | Smith |
| 2020/0409893 A1 | 12/2020 | Puttagunta |
| 2021/0019272 A1 | 1/2021 | Olarig |
| 2021/0028987 A1 | 1/2021 | Krivenok |
| 2021/0064281 A1 | 3/2021 | Satapathy |
| 2021/0124695 A1 | 4/2021 | Jaiswal |

OTHER PUBLICATIONS

"FC and FCoE versus iSCSI—"Network-centric" versus "End-Node-centric" provisioning," [online], [Retrieved Oct. 12, 2020], Retrieved from Internet <URL:. https://brasstacksblog.typepad.com/brass-tacks/2012/02/fc-and-fcoe-versus-iscsi-network-centric-versus-end-node-centric-provisioning.html> (6pgs).

"NVMe over Fabrics' Discovery problem," [online], [Retrieved Oct. 12, 2020] Retrieved from Internet <URL:. https://brasstacksblog.typepad.com/brass-tacks/2017/12/nvme-over-fabrics-discovery-problem.html> (2pgs).

"Hard zoning versus soft zoning in a FC/FCoE SAN," [online], [Retrieved Oct. 12, 2020] Retrieved from Internet <URL: https://brasstacksblog.typepad.com/brass-tacks/2012/01/hard-zoning-versus-soft-zoning-in-a-fcfcoe-san.html> (5pgs).

"NVM Express Over Fabrics," revision 1.0, May 31, 2016, [online], [Retrieved Oct. 12, 2020] Retrieved from Internet <URL:http://nvmexpress.org> (49pgs).

"NVM Express Over Fabrics," revision 1.1, Oct. 22, 2019, [online], [Retrieved Oct. 12, 2020] Retrieved from Internet <URL:http://nvmexpress.org> (83pgs).

"NVM Express Base Specification," revision 1.4, Jun. 10, 2019, [online], [Retrieved Oct. 12, 2020] Retrieved from Internet <URL:http://nvmexpress.org> (403pgs).

Notice of Allowance and Fee(s) Due, dated Aug. 3, 2022, in related U.S. Appl. No. 17/386,120. (9 pgs).

* cited by examiner

1100

| Zone Member |||
|---|---|---|

| Type | L | Value | |
|---|---|---|---|
| 01h | | The pair {NQN, Role} | ⌐1105 |
| 02h | | The pair {NQN+IP+Protocol, Role} | ⌐1110 |
| 03h | | The pair {NQN+IP+Protocol+Port, Role} | ⌐1115 |
| 04h | | A ZoneAlias name | ⌐1120 |
| 11h | | The pair {IP+Protocol, Role} | ⌐1125 |
| 12h | | The pair {IP+Protocol+Port, Role} | ⌐1130 |
| 13h | | The pair {IP_Subnet+Protocol, Role} | ⌐1135 |
| 14h | | The pair {IP_Subnet+Protocol+Port, Role} | ⌐1140 |

1150

| ZoneAlias Member |||
|---|---|---|

| Type | L | Value | |
|---|---|---|---|
| 01h | | The pair {NQN, Role} | ⌐1105 |
| 02h | | The pair {NQN+IP+Protocol, Role} | ⌐1110 |
| 03h | | The pair {NQN+IP+Protocol+Port, Role} | ⌐1115 |

| Bytes | Description | | | |
|---|---|---|---|---|
| *1205* | ZoneGroup Name | | | |
| *1210* | ZoneGroup Originator | | | |
| *1215* | Number of zones (a) | | | |
| | Zone Name #1 | | Offset to Zone data #1 | |
| | Zone Name #2 | *1220* | Offset to Zone data #2 | *1225* |
| | ... | | | |
| | Zone Name #a | | Offset to Zone data #a | |
| | Zone data #1 | | | |
| | Zone data #2 | *1230* | | |
| | ... | | | |
| | Zone data #a | | | |

ZoneGroup Representation

FIG. 12

| | ZoneGroup (Florence, NQN(CDC)) | ZoneGroup (Pisa, NQN(Storage3)) | | | ZoneGroup (Siena, NQN(CDC)) | |
|---|---|---|---|---|---|---|
| Zone Name | β | γ | δ | ε | φ | λ |
| Zone Members | Host A | Host B | Host C | Host D | Host E | Host A |
| | Storage 2 | Storage 3 | Storage 3 | Storage 3 | Storage 4 | Storage 4 |
| | Storage 1 | | | | Storage 5 | |

1300 — 1305 (Florence), 1310 (Pisa), 1315 (Siena)

Row: α — Host A — Storage 1 (ZoneGroup Florence)

FIG. 13

| Zone Name | ZoneGroup (Florence, NQN(CDC)) | | ZoneGroup (Pisa, NQN(Storage3)) | | | ZoneGroup (Siena, NQN(CDC)) | | |
|---|---|---|---|---|---|---|---|---|
| | αβ | | ρκ | | | λ | | |
| Zone Members | {Host A, host} | | {Host B, host} | {Host C, host} | | {Host E, host} | | {Host A, host} |
| | {Storage 1, subsystem} | | {Storage 3, subsystem} | | | {Storage 4, subsystem} | | {Storage 4, subsystem} |
| | {Storage 2, subsystem} | | | {Host D, host} | | {Storage 5, subsystem} | | |

DYNAMIC CONNECTIVITY MANAGEMENT THROUGH ZONE GROUPS

BACKGROUND

A. Technical Field

The present disclosure relates generally to information handling system. More particularly, the present disclosure relates to zoning in a Storage Area Network (SAN).

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Fibre Channel (FC) SAN zoning allows a SAN administrator to control communication between host and storage interfaces by grouping them to a zone. Zones may be created for a number of reasons, including to increase network security, and to prevent data loss or data corruption, by controlling access between devices or user groups. Once in a zone, the interfaces, now referred to as zone members, will be able to communicate with one another as soon as the zone has been added to the active zone set of their fabric.

Consider, by way of illustration, the example SAN network 100 depicted in FIG. 1. In the depicted example, there are three different zones, Zone A 105, Zone B 110, and Zone C 115. Each zone comprises one or more hosts (e.g., Server A 120 in Zone A) and one or more storage devices (e.g., Storage 1 125, Storage 2 130, and Storage 3 135). Grouping host and storage interfaces in this way enables hosts to automatically discover the storage ports they should access. If a zoning mechanism were not in use, a host would discover all of the host and storage ports in a fabric, which could lead to problems like elongated boot times and registered state change notification (RSCN) storms due to a flapping or intermittent interface.

However, maintaining a zoning database is involved and has limitations. In addition to having to be configured and to be configured correctly, only one zone set may be active at a time. FIG. 2 depicts the relationship between a Zone Set database or datastore 205 and an active Zone Set 245. As a preliminary matter, it is important to understand the relationship between the Zone Set datastore 205 and a Zone Enforcement Entity 240. As shown in FIG. 2, the Zone Set datastore 205 comprises one or more zone sets (e.g., Zone Set 1-Zone Set n), in which a zone set (e.g., Zone Set 1 (215)) may comprise one or more zones which may contain various zone members. It shall be noted that the datastore may comprises various zone sets, which may comprise various zones, which may have various members and attributes. Also, aliases, which is a convenient way to group a set of members to be managed, may also be identified and used. An administrator may connect 210 with the Zone Set datastore 205 to add, remove, access, edit, etc. a zone set or sets. A Zone Enforcement Entity 240 is an abstraction of the resources within a fabric that take the zone set information and enforce it in the fabric.

There are two primary methods for activating a zone set. First, "add" and "remove" requests 210 may be used to create a zone set in the datastore and then have the defined zone set activated 220 by the Zone Enforcement Entity 240. Second, direct communication may be had with the Zone Enforcement Entity 240 to activate 225 or deactivate 230 a zone set.

It is important to note a few limitations of such a system. First, only one zone set at a time can be active. For example, consider the zones illustrated in FIG. 1. Further, assume that the zone sets are defined as illustrated FIG. 3. Note that Zone Set 1 305 comprises Zone A 105 and Zone C 115, and that Zone Set 2 310 comprises Zone B 110. If Zone Set 1 was the active zone set implemented by the Zone Enforcement Entity 240, then Zone Set 2 (which comprises Zone B 110) would not be active. Second, if direct changes are made to an element of an active zone set (e.g., a new member was added or some other change), those changes are not automatically stored in the datastore 205. Thus, if a different zone set were activated, those changes would be lost. This issue is made particularly worse by the first issue in which only one zone set can be active at a time. Thus, if Zone Set 2 310 were made active, then changes to Zone Set 1 310, which is deactivated, may be lost.

Accordingly, it is highly desirable to find new, more efficient ways for zoning.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 11 depicts an example zone member data set or data structure and an example zone alias member data set or data structure, according to embodiments of the present disclosure.

FIG. 12 depicts an example alternative zone group representation data structure, according to embodiments of the present disclosure.

FIG. 13 depicts an example set of active zone groups, according to embodiments of the present disclosure.

FIG. 15 depicts another example set of active zone groups, according to embodiments of the present disclosure.

DETAILED DESCRIPTION OF EMBODIMENTS

Figure 1:
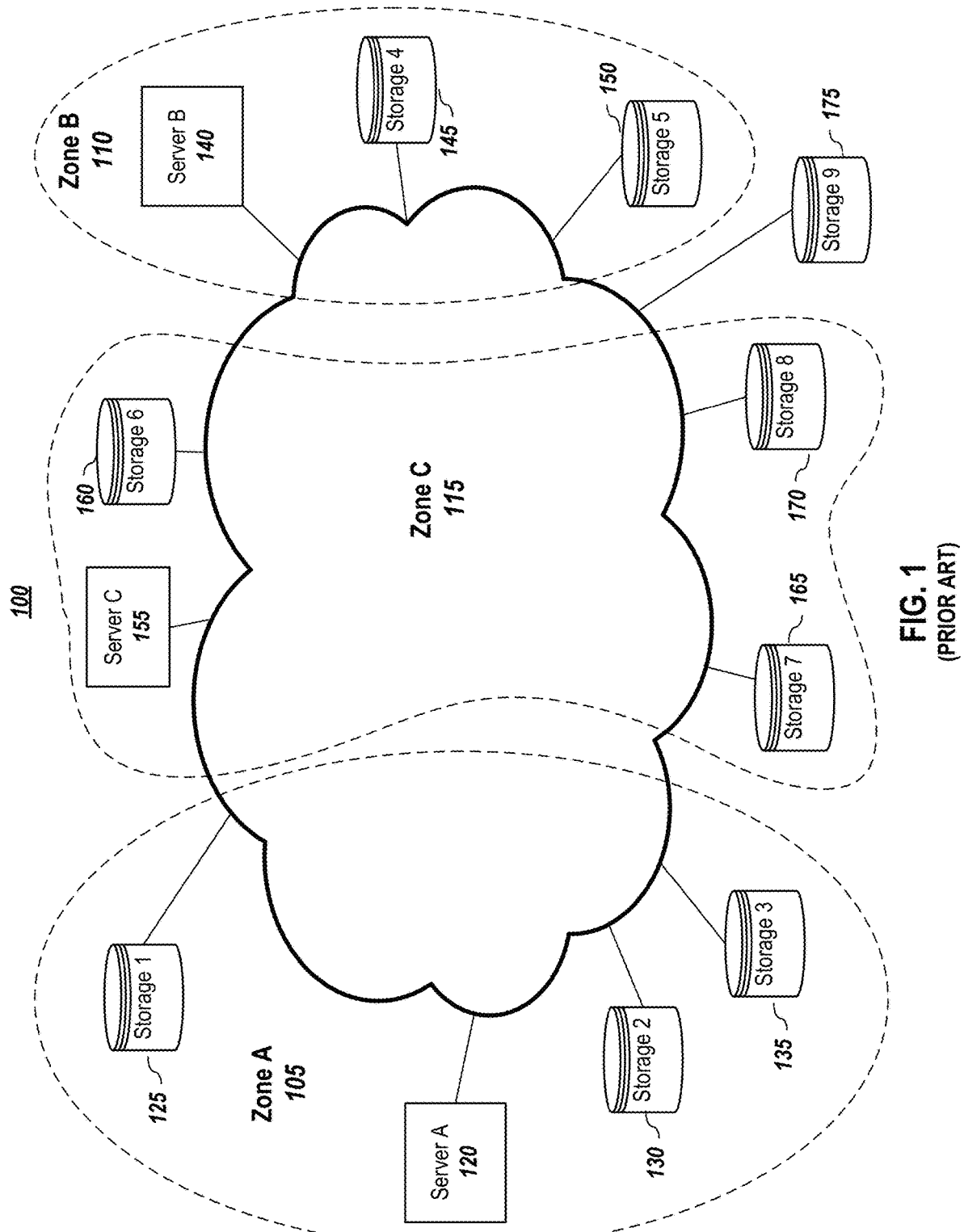
FIG. 1 ("FIG. 1") graphically depicts zones of a SAN.
Figure 2:
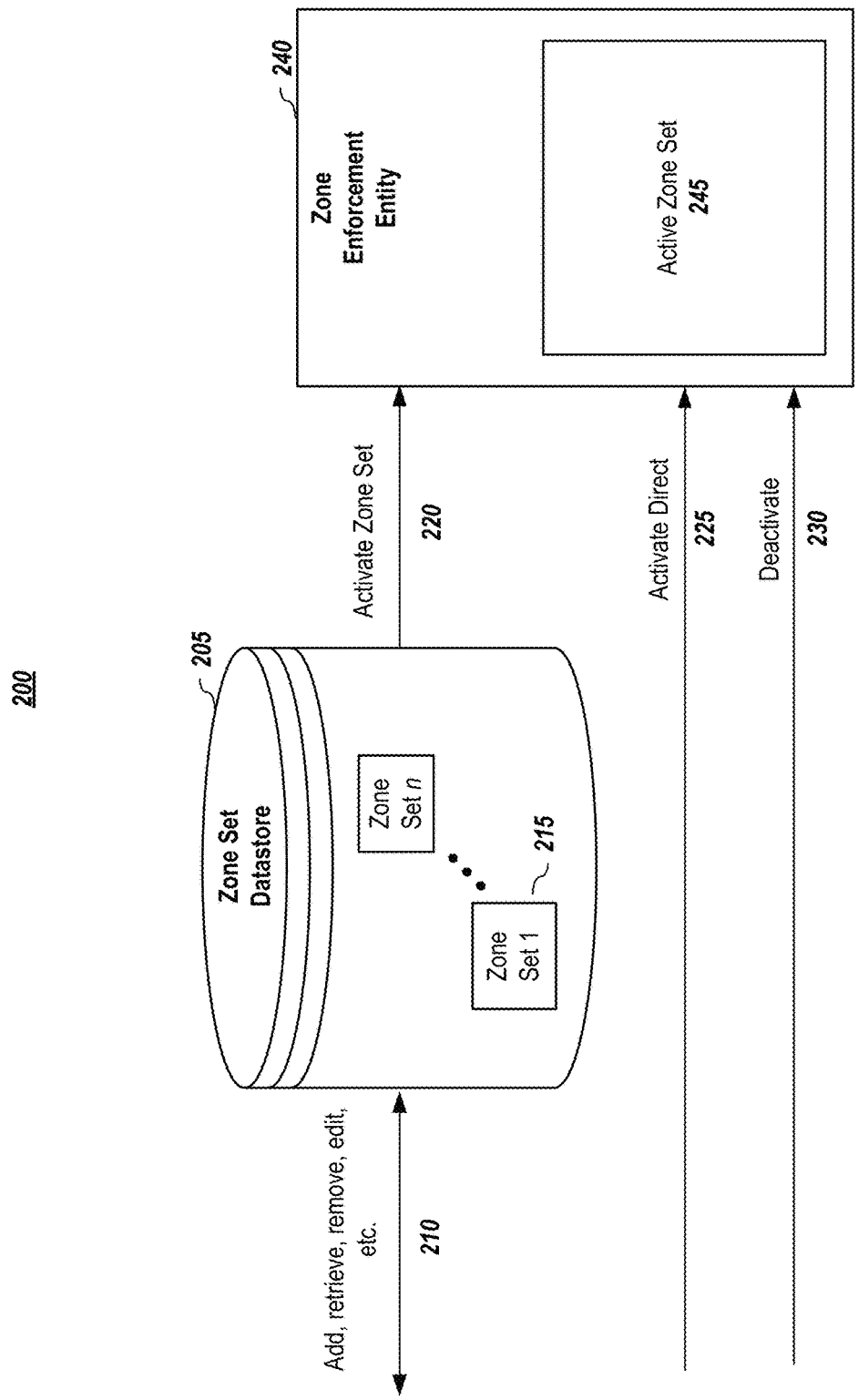
FIG. 2 depicts the relationship between a zone set database or datastore and an active zone set.
Figure 3:
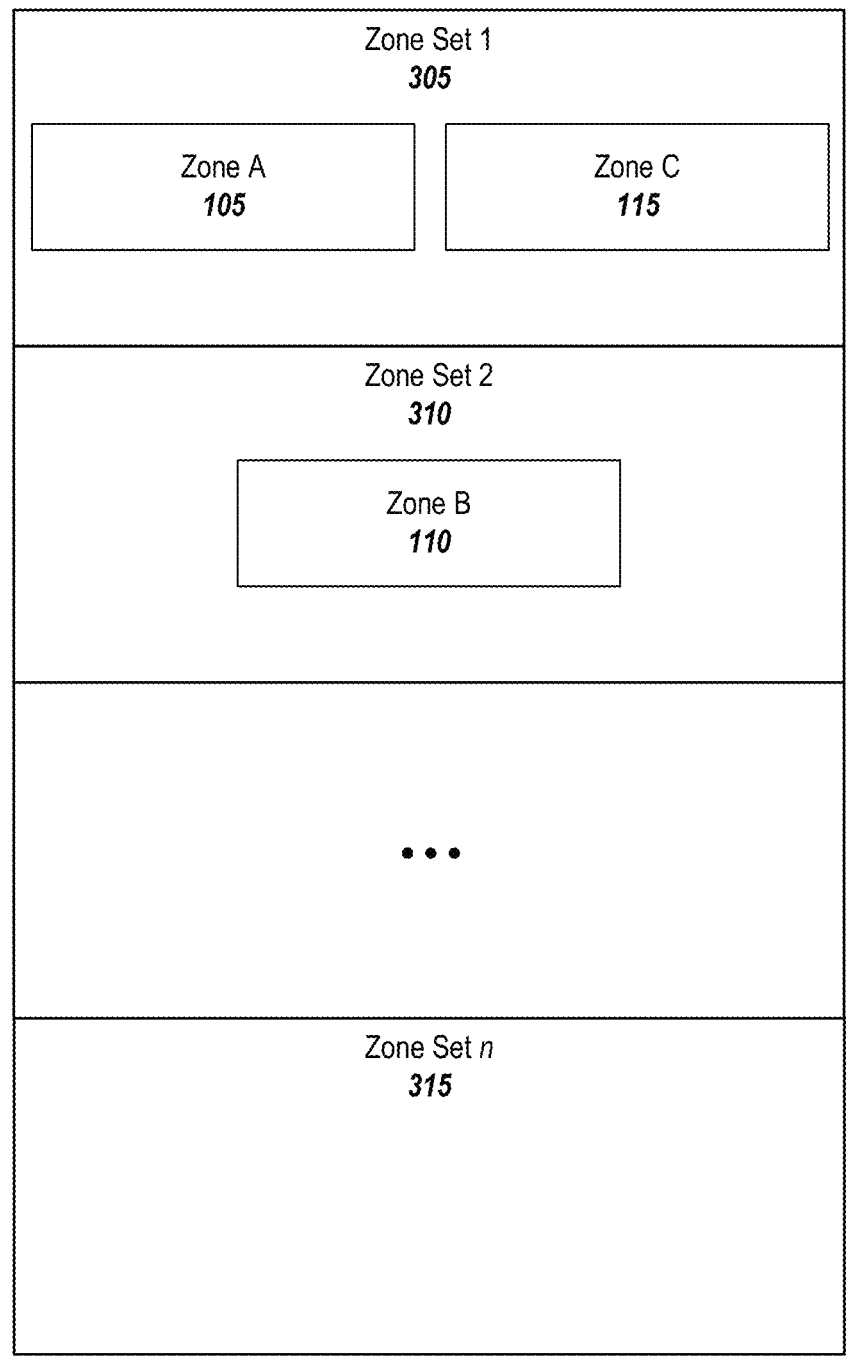
FIG. 3 illustrates some example defined zone sets.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

Note that embodiments herein include reference to data structures which may include a size field (e.g., bytes or length fields), that are presented as blank because the size of the field is not critical to aspects of the present patent document; the sizes may be selected as a matter of implementation choice.

It shall also be noted that although embodiments described herein may be within the context of NVMe-oF environments, aspects of the present disclosure are not so limited. Accordingly, the aspects of the present disclosure may be applied or adapted for use in other contexts.

A. General Background

As previously noted, current zoning systems utilize a zoning datastore. When compared to the alternative of needing to explicitly configure connectivity on each host, the administrative burden involved with properly maintaining a zoning database might seem insignificant. Nevertheless, users are still seeking relief from this task, and a technique known as peer zoning or target driven zoning (TDZ) has been employed.

TDZ automates zoning by allowing each storage interface to publish a list of host interfaces that should be allowed to access it. The fabric consumes this list and then automatically creates and activates a zone that allows appropriate access. While the TDZ technique has been proven to work, it can complicate the zone set activation process, as well as create some issues with zone set administration.

The administrative challenges are primarily related to scope. When a SAN admin uses the Fibre Channel (FC) switch or Fabric manager user interface (UI) to make changes to the active zone set, they expect the zone set they activate to define all connectivity allowed within the fabric. The challenge is that TDZ updates the active zone set to include zones that were automatically generated based on information provided by the storage interfaces. As a result, if a SAN admin were to re-activate a zone set that they had previously defined, they could unintentionally overwrite these automatically generated zones and cause a "Data Unavailability" event. In addition, since each zone name must be unique, an administrator can unintentionally create conflicts with zones that were created by other administrators. Finally, because of the potential for a zone set activation to have unintended consequences (e.g., impact unrelated hosts), there is a tendency by customers to require zone set activations to go through a formal change control authorization process. All of these concerns conspire to make the current zoning process a very rigid and inflexible model for managing connectivity. As infrastructure becomes increasingly dynamic in nature, managing connectivity needs to be dynamic as well.

Figure 4:
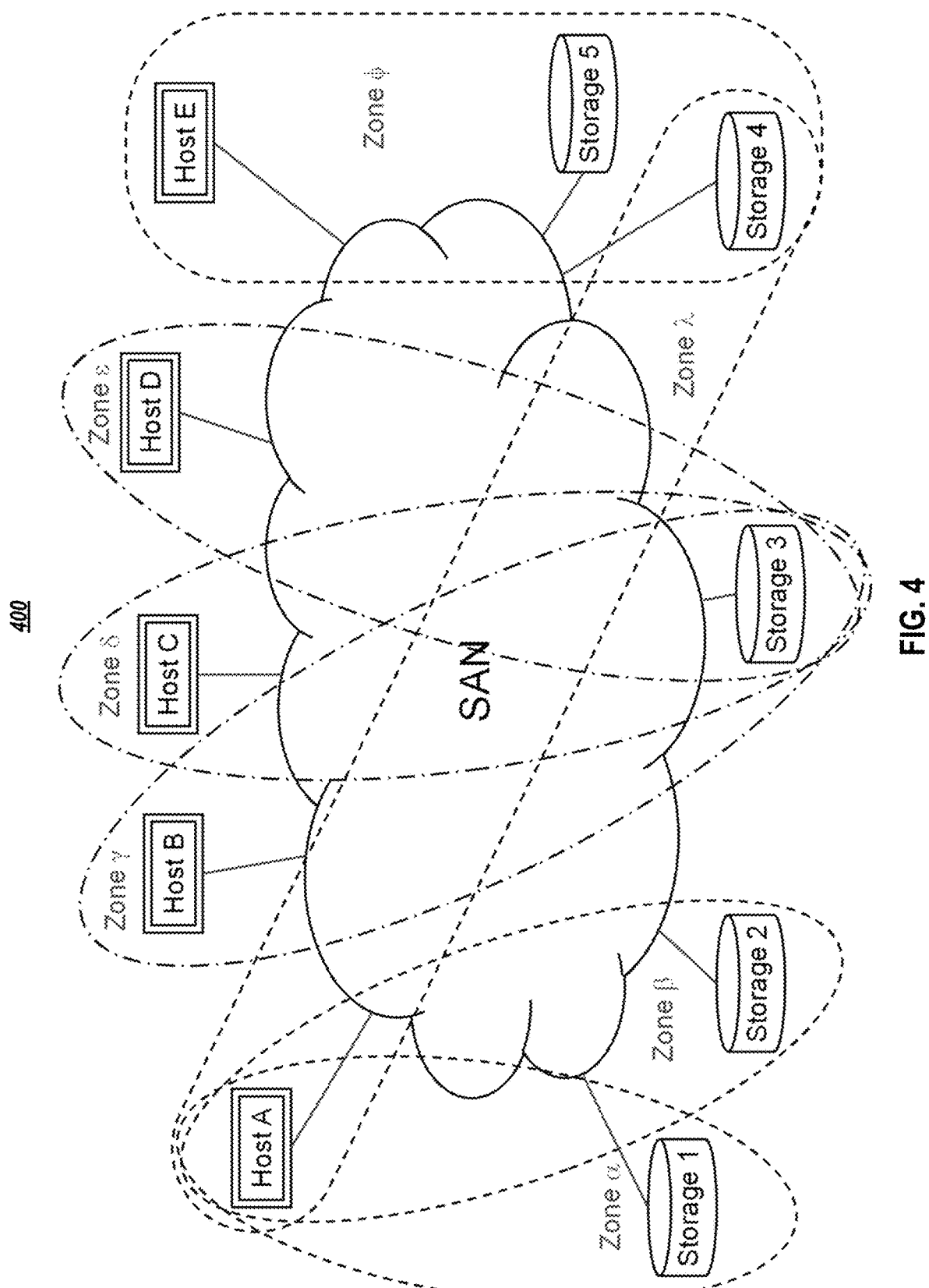
FIG. 4 graphically depicts a SAN 400 with an example zone set.

Consider the following example zone set named "Rome":

4 and storage 5 as part of the zone and therefore they can communicate. FIG. 4 graphically depicts a SAN 400 with the Rome zone set.

This is a monolithic access control configuration, in which zones $\alpha$, $\beta$, $\phi$, and $\lambda$ are centrally managed, and zones $\gamma$, $\delta$, and $\epsilon$, may be generated by Storage 3. In this illustration, to remove Host A access from Storage 4, an administrator must change the entire Zone Set. Thus, altering or remove Zone $\lambda$, which is a member of the zone set, risks destroying the access control configuration generated by Storage 3 (i.e., zones $\gamma$, $\delta$, and $\epsilon$).

Accordingly, systems and methods are needed that can support more dynamic and granular approaches to zoning and zone management.

B. Centralized Discovery Controller or Service (CDC) Zoning Embodiments

1. CDC Zoning Datastore Embodiments

Figure 5:
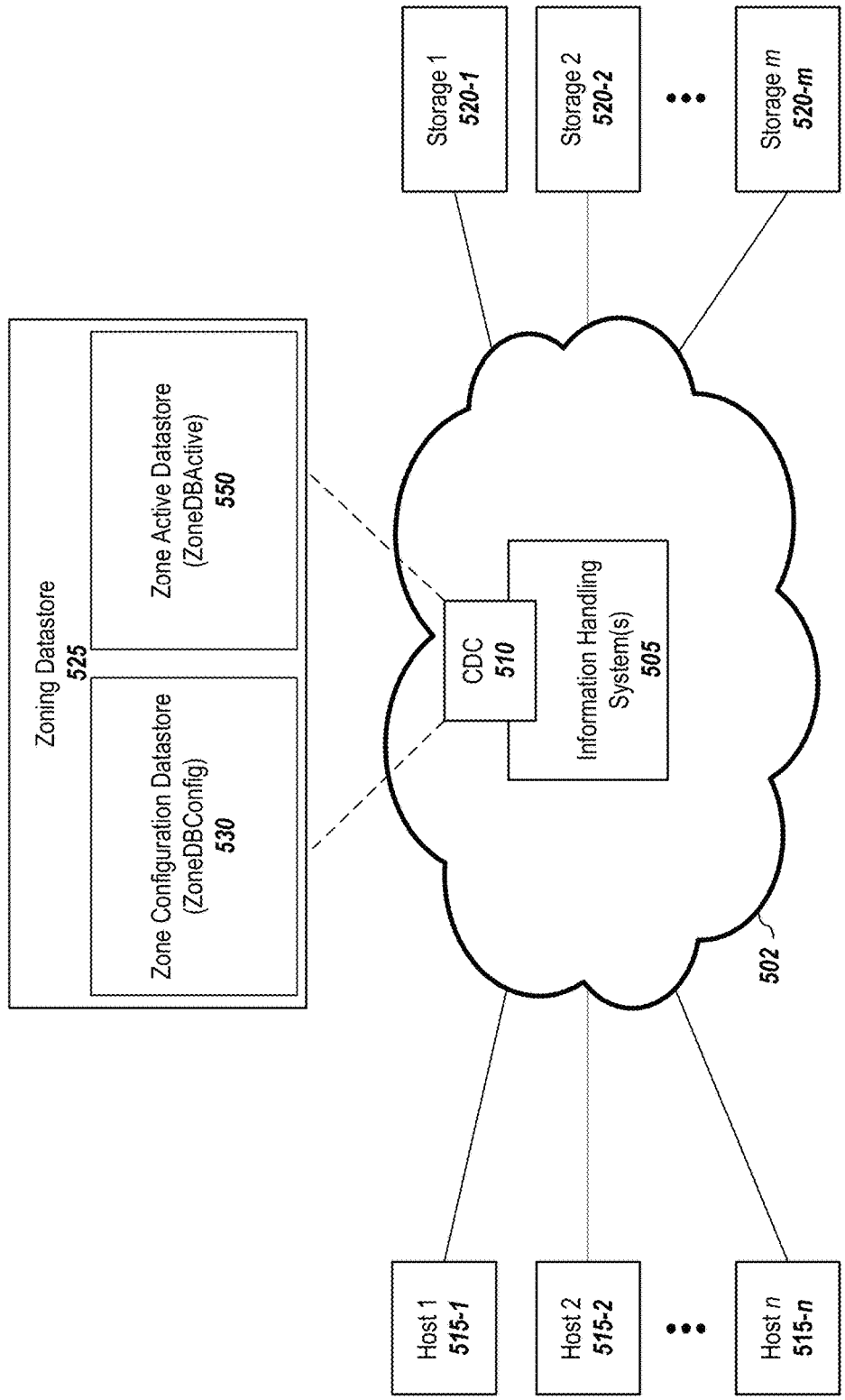
FIG. 5 depicts a network that comprises a centralized zoning datastore, according to embodiments of the present disclosure.

FIG. 5 depicts a network 502 that comprises a centralized zoning datastore, according to embodiments of the present disclosure. The CDC 510 represents an entity that maintain the pertinent fabric information and provides a single or centralized management interface for control and management of the NVMe over Fabrics (NVMe-oF) network. In one or more embodiments, one or more information handling systems 505 within a network, such as a cloud environment, comprise or support the CDC 510, which comprises a zoning datastore 525 that helps facilitate zoning features of the present disclosure. Also depicted in FIG. 5 are hosts 515 and storage devices 520 that may be configured for access between the different devices according to zoning.

In one or more embodiments, the zoning database or datastore 525 comprises a zone configuration datastore (ZoneDBConfig) 530 and zone active datastore (ZoneDBActive) 550. ZoneDBConfig 530 represents where zone groups are configured, modified, deleted, etc., and the ZoneDBActive are the zone group(s) that are enforced. The functions of each of these datastores will be described in more detail below.

2. Zone Active Datastore Embodiments

Figure 6:
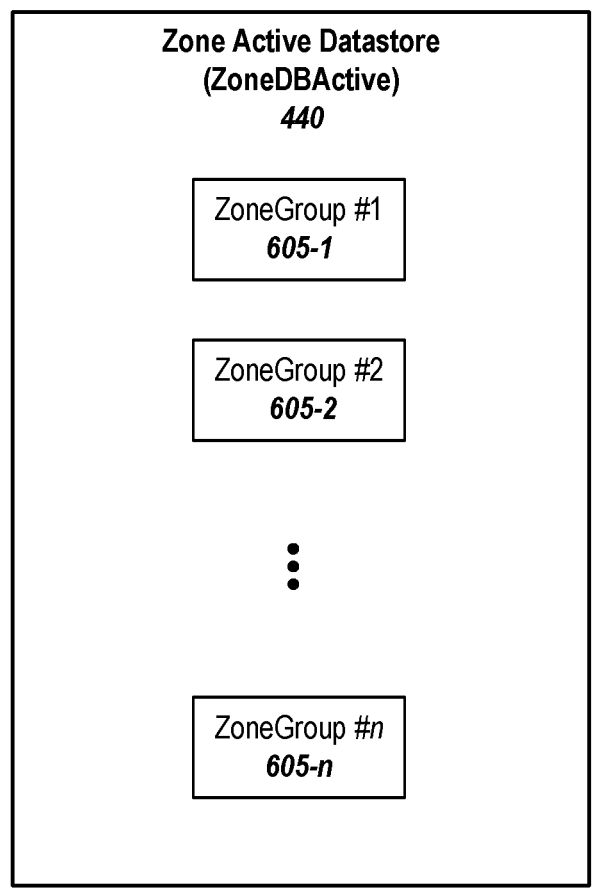
FIG. 6 depicts an example zone active database or datastore (ZoneDBActive), according to embodiments of the present disclosure.

FIG. 6 depicts an example zone active database or datastore (ZoneDBActive), according to embodiments of the present disclosure. The ZoneDBActive 440 of FIG. 6 comprises one or more zone groups that are active. In the depicted example, zone group 605-1 through zone group 605-$n$ are currently active. In one or more embodiments, a zone group may include one or more zones, members, aliases, attributes, etc. Note that, unlike typical zoning that only allows one active access control policy to be active at

| | Zone Set "Rome" | | | | | | |
|---|---|---|---|---|---|---|---|
| Zone Name | $\alpha$ | $\beta$ | $\gamma$ | $\delta$ | $\epsilon$ | $\phi$ | $\lambda$ |
| Zone Members | Host A Storage 1 | Host A Storage 2 | Host B Storage 3 | Host C Storage 3 | Host D Storage 3 | Host E Storage 4 Storage 5 | Host A Storage 4 |

The zones in zone set "Rome" comprise the typical 2-member zone configuration to allow each host to access only the storage allocated to it, with the exception of zone $\phi$. Zone $\phi$, is depicted, for illustration purposes, with storage once, more than one zone group may be active at a time, which provides greater granularity over the active zone groups. One zone group may be removed or changed without affecting the activation state of other active zone groups.

Note that, in one or more embodiments, the ZoneDBActive 440 facilitates enforcement actions, such as log page filtering, event notifications, network-level restrictions, among other actions. The zone groups in the ZoneDB Active 440 may be activated and enforced by the CDC in terms of filtering the discover information provided to hosts and storage elements.

3. Zone Configuration Datastore Embodiments

Figure 7:
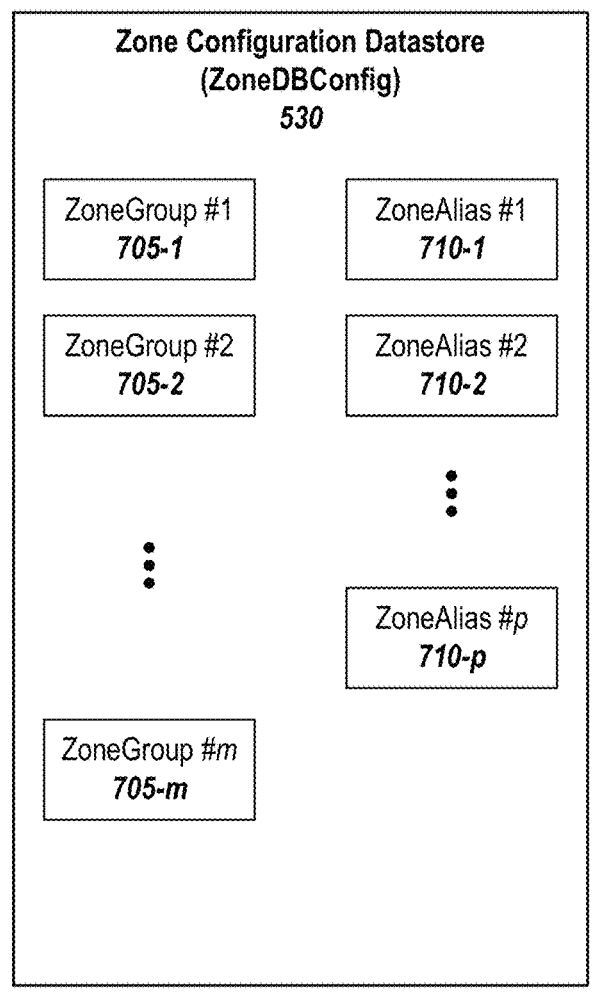
FIG. 7 depicts a zone configuration database or datastore (ZoneDBConfig), according to embodiments of the present disclosure.

FIG. 7 depicts a zone configuration database or datastore (ZoneDBConfig), according to embodiments of the present disclosure. In one or more embodiments, the ZoneDBConfig 530 represents where non-active zone groups 705 and/or zone aliases 710 are configured, stored, modified, deleted, etc. A zone alias provides a means to group one or more members together and enable referencing all its members through the zone alias name.

C. Zone Group-Related Data Structure Embodiments

1. Zone Group Data Structure Embodiments

Figure 8:
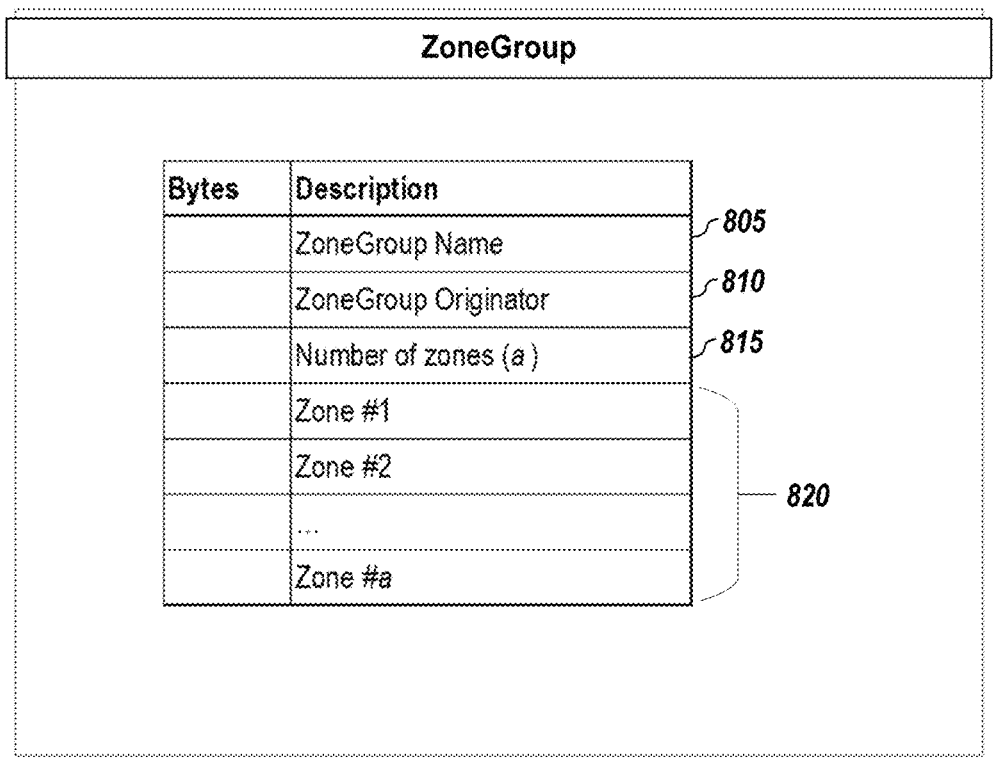
FIG. 8 depicts an example zone group dataset or data structure, according to embodiments of the present disclosure.

In one or more embodiments, a zone group is a unit of activation (i.e., a set of access control rules enforceable by the CDC). FIG. 8 depicts an example zone group 800 dataset or data structure, according to embodiments of the present disclosure. In one or more embodiments, a zone group 705 in FIG. 7 may comprise the data structure 800 represented in FIG. 8.

In one or more embodiments, a zone group comprises a ZoneGroup Name identifier 805 and a ZoneGroup Originator identifier 810. In the depicted example, the zone group 800 includes a list of one or more zone definitions 820 that are members of the zone group and also includes an indicator 815 of how many zone definitions are in the group.

In one or more embodiments, a ZoneGroup Originator is an identifier (e.g., an NVMe Qualified Name (NQN)) of the entity that created or configured the zone group. For example, in one or more embodiments, the NQN may be the CDC's NQN, if the zone group was created/configured via the CDC; or, the NQN may be the NQN of an NVM subsystem, if the zone group was created via an NVM subsystem. It shall be noted that identifying the originator allows the system to know what entity can manage or alter an existing zone group.

In one or more embodiments, a zone group 800 may be uniquely identified by a pair, e.g., {ZoneGroup Name, ZoneGroup Originator}, and a zone identifier may be defined by the tuple {{ZoneGroup Name, ZoneGroup Originator}, Zone Name}. It should be noted that previous approaches used global naming, which could create conflicts if two zones had the same name. Thus, such a system only works well if there is a single administrator who is carefully tracking each zone name to ensure that each one is unique. However, there typically is not a single administrator, particularly for large systems, which creates an environment in which zone naming conflicts could easily occur. Unlike the global naming used by previous approaches, each zone in embodiments herein is uniquely identified by the tuple so there will not be a conflict between different zones with the same zone name belonging to different zone groups. For example, if an NVM subsystem configured a zone, Zone Alpha, in a Zone Group 1 and the CDC configures a zone, Zone Alpha, is Zone Group 2, there will not be a conflict between these two zone names because the two zone identifiers are the tuple (e.g., {ZG1, ZGO-NVM_Sub1, Alpha} vs. {ZG2, ZGO-CDC, Alpha}).

2. Zone Data Structure Embodiments

Figure 9:
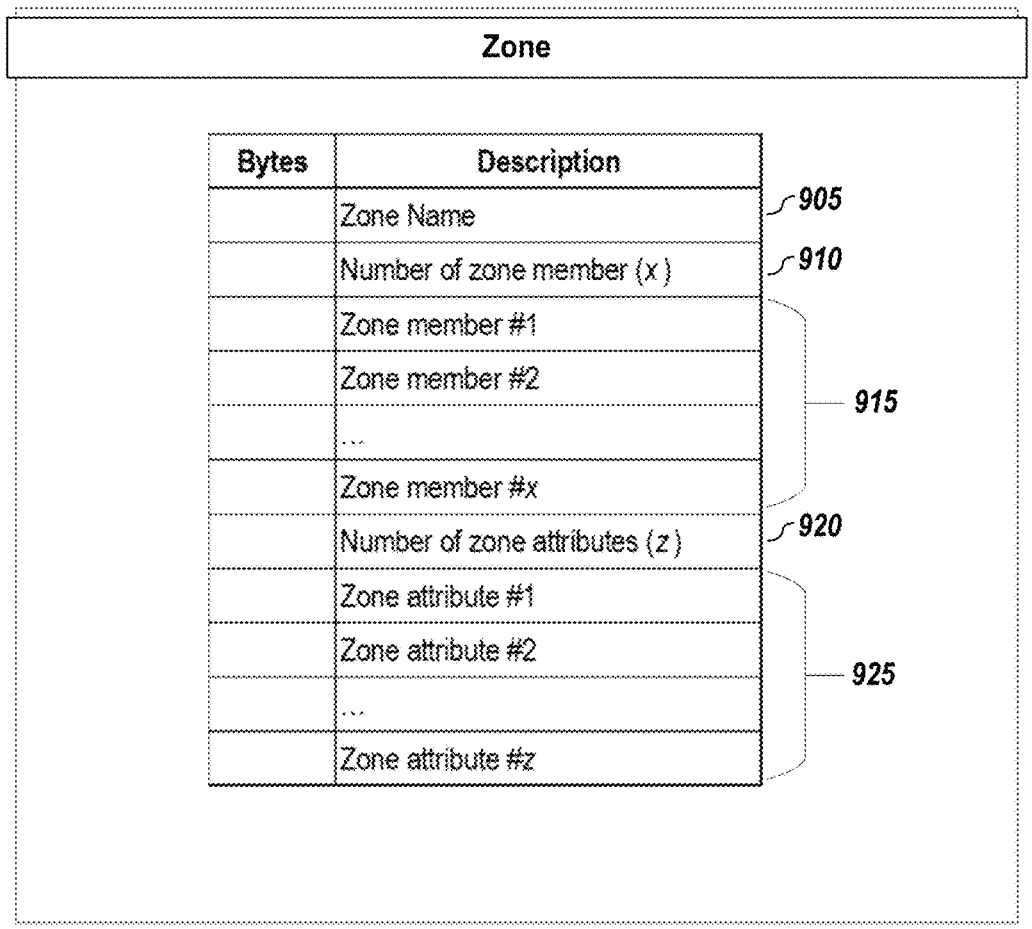
FIG. 9 depicts an example zone data set or data structure, according to embodiments of the present disclosure.

FIG. 9 depicts an example zone 900 data set or data structure, according to embodiments of the present disclosure. In one or more embodiments, the zone data 820 of a zone (e.g., Zone #1) may be represented by the zone 900 data set.

In one or more embodiments, a zone data structure 900 may comprise a zone name 905, an indicator of the number of zone members 910 in the zone 900, and an identifier for each of the one or more zone members 915. In one or more embodiments, the zone data structure 900 may also include an indicator of the number of zone attributes 920 in the zone 900 and an identifier for each of the one or more zone attributes 925.

3. Zone Alias Data Structure Embodiments

Figure 10:
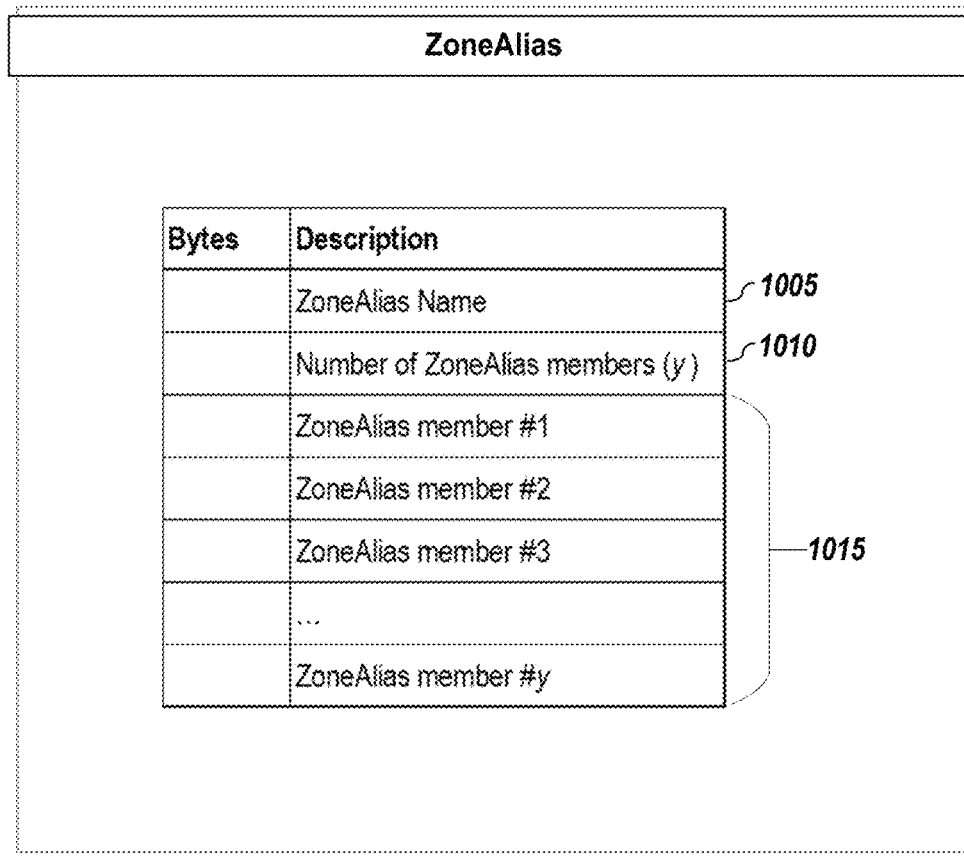
FIG. 10 depicts an example zone alias data set or data structure, according to embodiments of the present disclosure.

In one or more embodiments, a grouping of NVMe entities may be identified and referenced by a zone alias name or identifier. FIG. 10 depicts an example zone alias 1000 data set or data structure, according to embodiments of the present disclosure.

In one or more embodiments, a zone alias data structure 1000 may comprise a zone alias name 1005, an indicator of the number of zone alias member 1010 in the zone alias 1000, and an identifier for each of the one or more zone alias members 1015.

4. Zone Member and Zone Alias Member Data Structure Embodiments

FIG. 11 depicts an example zone member 1100 data set or data structure and an example zone alias member data set or data structure 1105, according to embodiments of the present disclosure.

In one or more embodiments, the zone member data 915 (e.g., Zone member #1) in FIG. 9 may be represented by the zone member data structure 1100. In one or more embodiments, a zone member data structure 1100 may be a type-length-value (TLV) data structure representation and may comprise the following zone member types:

01h-{NQN, Role} 1105, which identifies the zone member through its NQN identifier and indicates the zone member's role (e.g., host or subsystem—note that the role is not equivalent to the device type but rather defines its function—for example, one storage device may be backed up by another storage device, which case one storage device operates in the role as a host and the other operates as in the role of a subsystem). This zone member type identifies all physical ports, all IP protocols (e.g., TCP or UDP), and all IP protocol ports (e.g., TCP port 4420) that can be used by the NVMe-oF entity identified by the zone member NQN;

02h-{NQN+IP+Protocol, Role} 1110, which identifies the zone member through its NQN identifier, one IP address, plus one IP protocol (e.g., TCP or UDP), and indicates the zone member's role. This zone member type identifies a specific physical port (through the IP address), and the specific IP protocol (e.g., TCP) used by the NVMe-oF entity identified by the zone member's NQN over that physical port;

03h-{NQN+IP+Protocol+Port, Role} 1115, which identifies the zone member through its NQN identifier, one IP address, one IP protocol (e.g., TCP or UDP), plus one related IP protocol port number (e.g., a TCP port number), and indicates the zone member's role. This zone member type identifies a specific physical port (through the IP address), and the specific IP protocol (e.g., TCP) and IP protocol port (e.g., TCP port 4420) used by the NVMe-oF entity identified by the zone member's NQN over that physical port;

04h-ZoneAlias name 1120, which identifies a zone alias (see, e.g., FIG. 10), which may comprise one or more zone alias members;

11h-{IP+Protocol, Role} 1125, which identifies the zone member through its IP address, plus one IP protocol (e.g., TCP or UDP), and indicates the zone member's role. This zone member type identifies the physical port (through the IP address) of an NVMe-oF entity, and the specific IP protocol (e.g., TCP) used by the NVMe-oF entity over that physical port;

12h-{IP+Protocol+Port, Role} 1130, which identifies the zone member through its IP address, one IP protocol (e.g., TCP or UDP), plus a related IP protocol port number (e.g., a TCP port number), and indicates the zone member's role. This zone member type identifies the physical port (through the IP address) of an NVMe-oF entity, and the specific IP protocol (e.g., TCP) and IP protocol port (e.g., TCP port 4420) used by the NVMe-oF entity over that physical port;

13h-{IP_Subnet+Protocol, Role} 1135, which identifies the zone member through one IP subnet address, plus one IP protocol (e.g., TCP or UDP), and indicates the zone member's role. This zone member type identifies the set of physical ports of multiple NVMe-oF entities having IP addresses belonging to the specified IP subnet, physical ports over which the identified NVMe-oF entities use the specified IP protocol (e.g., TCP);

14h-{IP_Subnet+Protocol+Port, Role} 1140, which identifies the zone member through one IP subnet address, one IP protocol (e.g., TCP or UDP), plus one IP protocol port number (e.g., a TCP port number), and indicates the zone member's role. This zone member type identifies the set of physical ports of multiple NVMe-oF entities having IP addresses belonging to the specified IP subnet, physical ports over which the identified NVMe-oF entities use the specified IP protocol (e.g., TCP) and IP protocol port (e.g., TCP port 4420);

In one or more embodiments, the zone alias member data 1015 (e.g., Zone alias member #1) in FIG. 10 may be represented by the zone alias member data structure 1150. Note that for zone alias members the same or similar TLVs 1150 as used in zone member data set 1100 may be used.

It shall be noted that fewer, more, and/or different TLVs may be used for zone members and for zone alias members.

5. Alternative Zone Group Representation Dataset or Data Structure Embodiments FIG. 12 depicts an example alternative zone group representation data structure 1200, according to embodiments of the present disclosure. As illustrated in the FIG. 12, in one or more embodiments, a zone group comprises ZoneGroup Name identifier 1205 and ZoneGroup Originator identifier 1210. In one or more embodiments, a ZoneGroup Originator is the NVMe Qualified Name (NQN) of the entity that created or configured the zone group. For example, in one or more embodiments, the NQN may be the CDC's NQN, if the zone group was created/configured via the CDC; or, the NQN may be the NQN of an NVM subsystem, if the zone group was created via an NVM subsystem. In the depicted example, the zone group 1200 includes an indicator 1215 of how many zones are in the group and a list of the zone names 1220 that are members of the zone group.

It shall be noted that, to this point, the data structure 1200 of the zone group is the same as or very similar to that of the zone group data structure 800 in FIG. 8. However, unlike the zone group data structure 800 in FIG. 8, the zone group data structure 1200 in FIG. 12 includes, for a zone, its corresponding offset 1225 to the data for that zone. The offset 1225 helps quickly identify the location of the data 1230 (e.g., data such as depicted in the embodiment 900 shown in FIG. 9) and saves having to parse through the data structure to find the data relevant to the zone of interest. The approach is particularly helpful if there are a number of zone names 1220 and the zone of interest is at or near the bottom of the list 1220. Note that, in one or more embodiments, use of embodiment of the data structure depicted in FIG. 12 means that a different embodiment of a data structure than that shown in FIG. 9 may be used. Specifically, the zone name 905 need not be included in the zone data 1230.

D. Zone Member Rules

In one or more embodiments, a zone member or members may be subject to one or more rules. Presented below are some example rules that may be applied:

In one or more embodiments, a Zone of a ZoneGroup belonging to the ZoneDBConfig may use all Zone member types defined in 1100.

In one or more embodiments, a Zone of a ZoneGroup belonging to the ZoneDBActive does not contain the ZoneAlias member type. Rather, when a ZoneGroup belonging to the ZoneDBConfig is activated and becomes part of the ZoneDBActive, all ZoneAliases are resolved in the group of NVMe entities referenced by the ZoneAlias name.

In one or more embodiments, the Role may assume one of a set number of values. For example, the Role may be one of two values: Host or Subsystem.

In one or more embodiments the members of a Zone may communicate with each other according to a set of rules, such as:

Host can communicate with Subsystems;
Subsystems can communicate with Hosts;
Hosts cannot communicate with Hosts; and
Subsystems cannot communicate with Subsystems.

It shall be noted that the rules presented above were provided by way of illustration and fewer, more, and/or different configured rules may be applied.

E. Example Zone Group Embodiments and Methods

Figure 14:
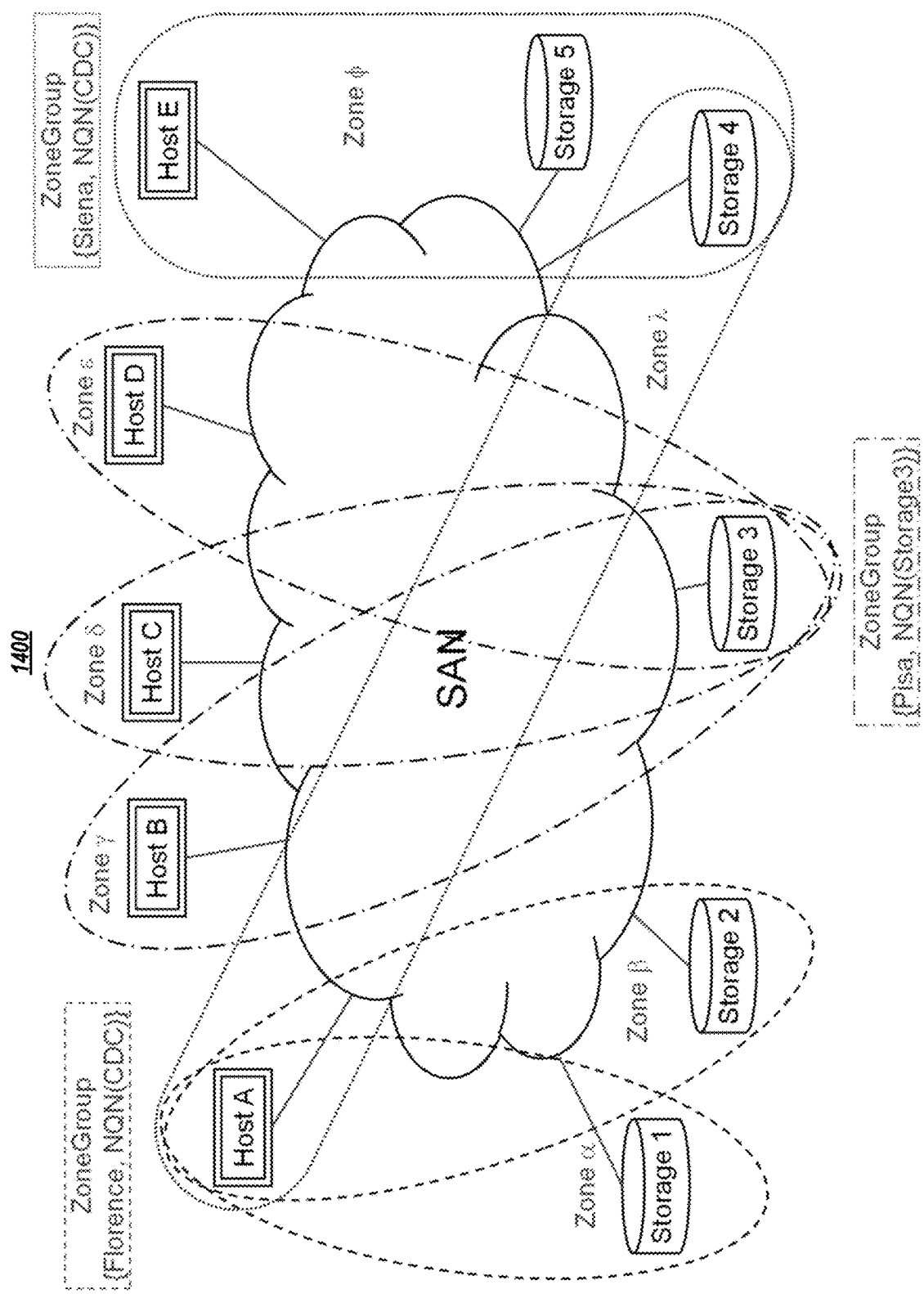
FIG. 14 graphically depicts a SAN network with the active zone groups and zones from FIG. 13, according to embodiments of the present disclosure.

FIG. 13 depicts an example set of active zone groups 1300, according to embodiments of the present disclosure. In FIG. 13, there are three zone groups: ZoneGroup Florence 1305, ZoneGroup Pisa 1310, and ZoneGroup Siena 1315. Each zone group comprises a plurality of zones. FIG. 14 graphically depicts a SAN network 1400 with the active zone groups and zones from FIG. 13, according to embodiments of the present disclosure.

In the depicted example, note that there is modular access control configuration for the zone groups: ZoneGroups {Florence, NQN(CDC)} and {Siena, NQN(CDC)} are centrally managed by the CDC and ZoneGroup {Pisa, NQN (Storage3)} is generated by Storage 3. Unlike prior approaches, to remove Host A access from Storage 4, only ZoneGroup {Siena, NQN(CDC)} needs to be updated—the other zone groups are unaffected and can remain active during the change to remove Host A. Thus, Zone λ can be removed from ZoneGroup {Siena, NQN(CDC)} in order to remove Host A's access to Storage 4 without the other zone groups being affected.

Figure 16:
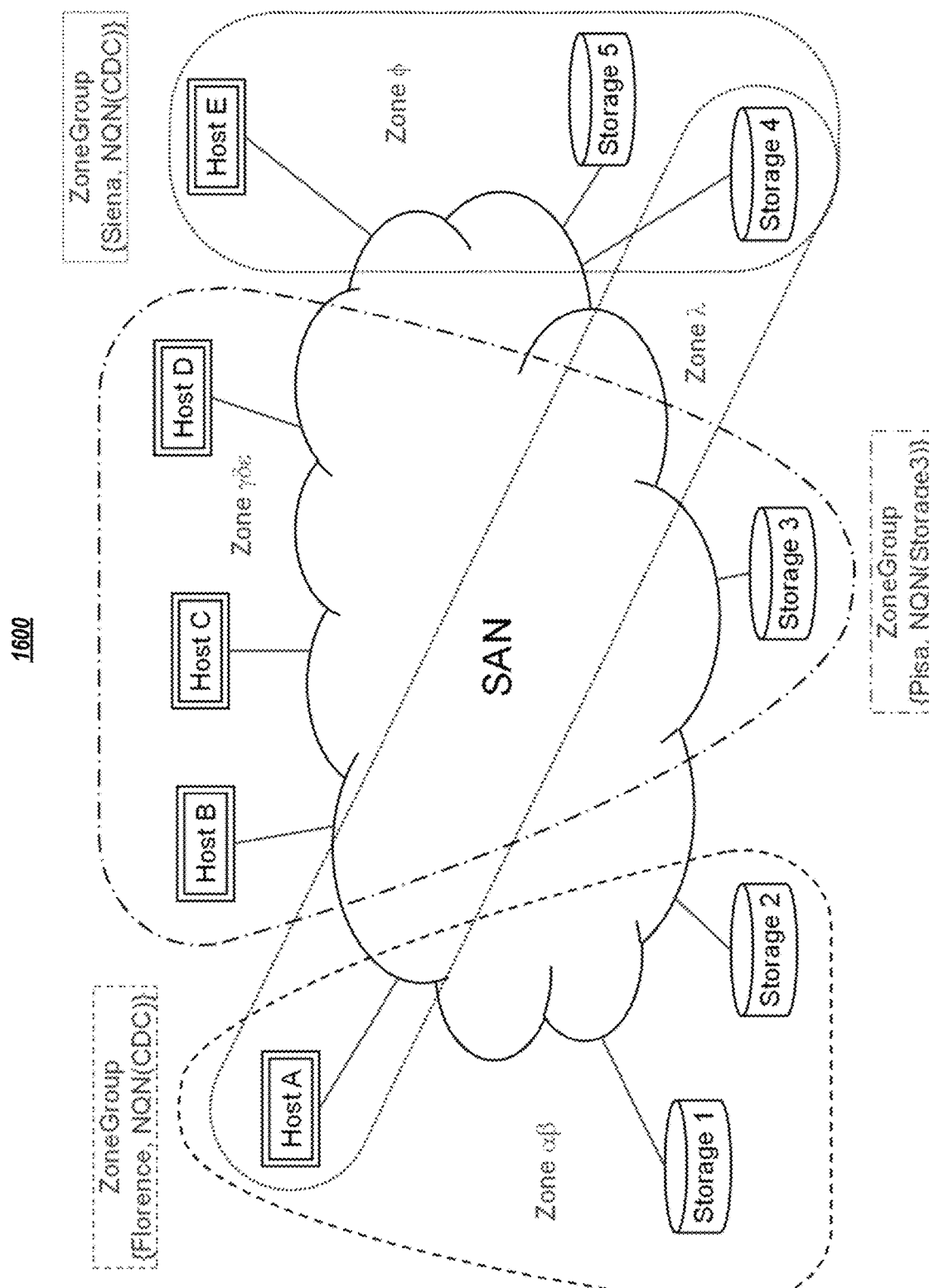
FIG. 16 graphically depicts a SAN network with the active zone groups and zones from FIG. 15, according to embodiments of the present disclosure.

FIG. 15 depicts another example set of active zone groups 1500, according to embodiments of the present disclosure. In FIG. 15, there are three zone groups: ZoneGroup Florence 1505, ZoneGroup Pisa 1510, and ZoneGroup Siena 1515. Unlike the defined zone groups in FIG. 13, which did not include zone member roles, the depicted embodiment of FIG. 15 does include zone member roles (e.g., host or subsystem). FIG. 16 graphically depicts a SAN network 1600 with the active zone groups and zones from FIG. 15, according to embodiments of the present disclosure.

Note that the embodiment does not contain just 2-member zones as typically done. In the depicted embodiment, role access rules define the proper access control. In zone φ, host E can access storage 4 and storage 5, but now storage 4 and storage 5 cannot communicate, which resolves the issues created by previous implementations that did not have defined role access rules.

In the network shown in FIG. 16, as with the network in FIG. 14, to remove Host A access from Storage 4, only ZoneGroup {Siena, NQN(CDC)} needs to be updated—the other zone groups are unaffected and can remain active during the change to remove Host A.

Figure 17:
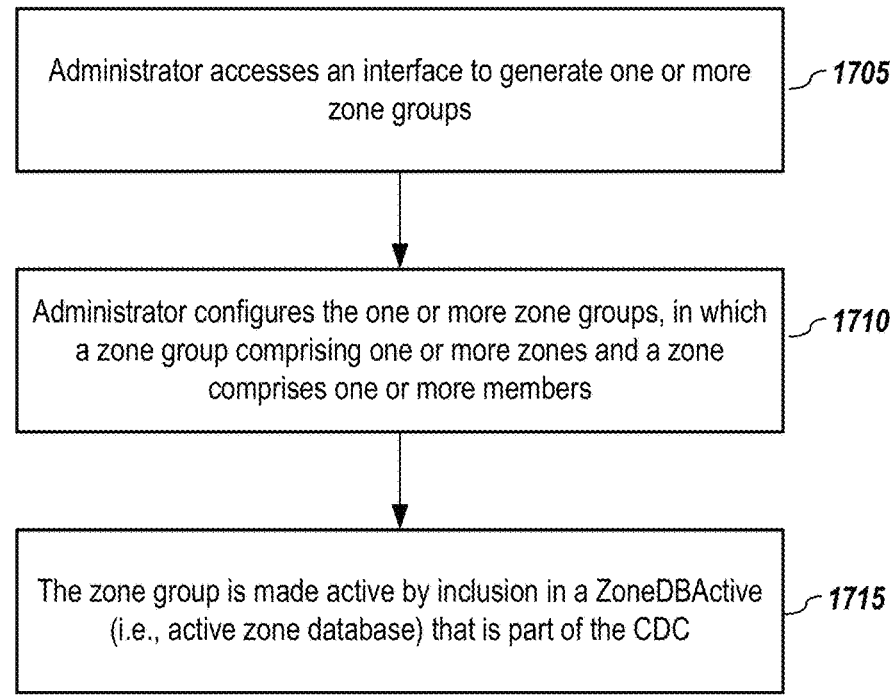
FIG. 17 depicts a method for configuring a zone group, according to embodiments of the present disclosure.
Figure 18:
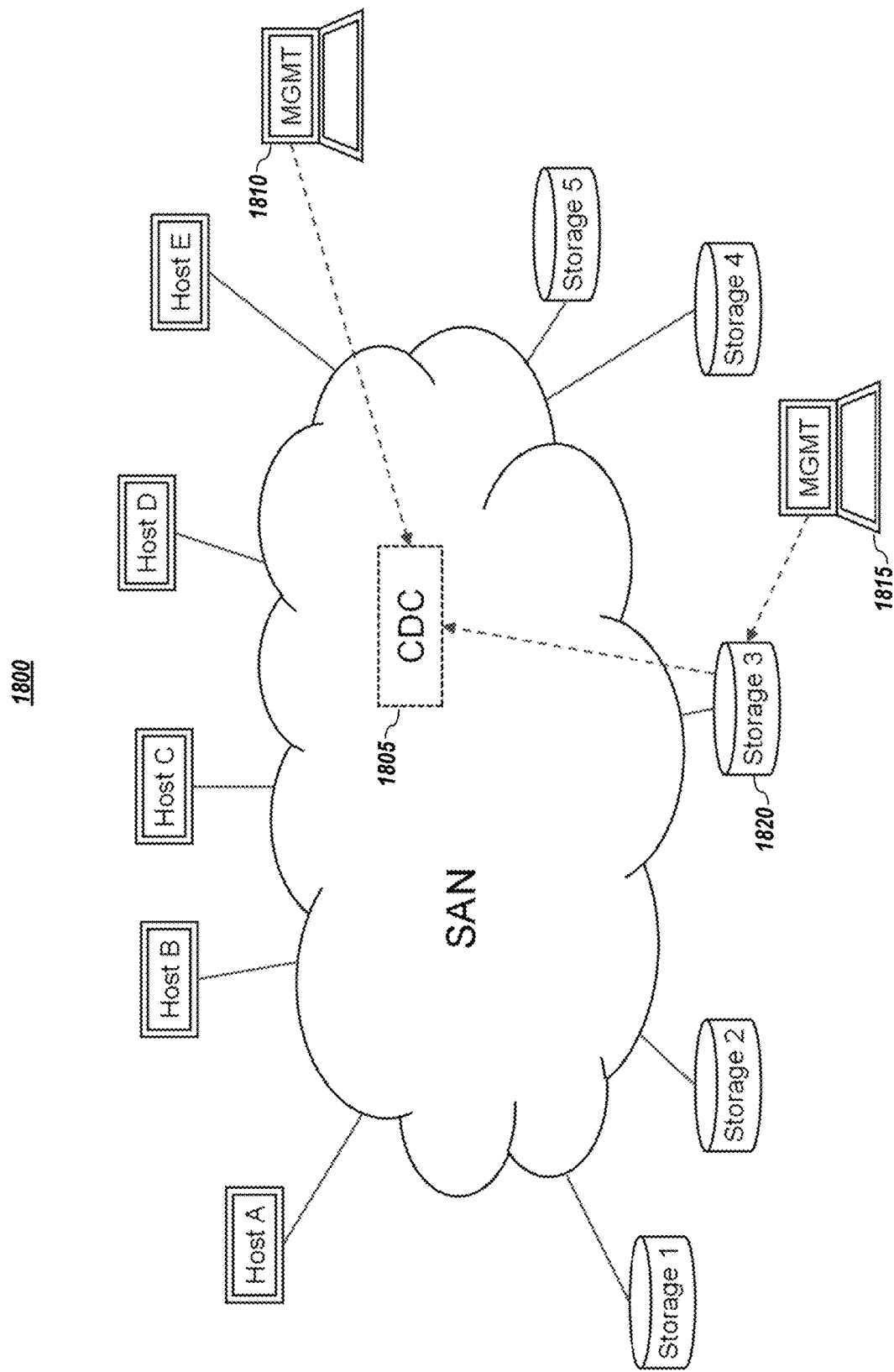
FIG. 18 depicts embodiments of interfaces for interacting directly or indirectly with the centralized discovery controller or service (CDC), according to embodiments of the present disclosure.

FIG. 17 depicts a method for configuring a zone group, according to embodiments of the present disclosure. In one or more embodiments, an administrator accesses (1705) an interface that facilitates access to the CDC. As illustrated in FIG. 18, in one or more embodiments, the interface may be a management interface 1810 that directly interacts with the CDC 1805; additionally or alternatively, the interface may be a management interface 1815 of a storage device (e.g., storage 3 1820) that interacts with the CDC 1805. Via the interface, the administrator configures (1710) the one or more zone groups, in which a zone group comprising one or more zones and a zone comprises one or more members. Having configured the zone group, it is made active by inclusion in a ZoneDBActive database that is part of the CDC.

Figure 19:
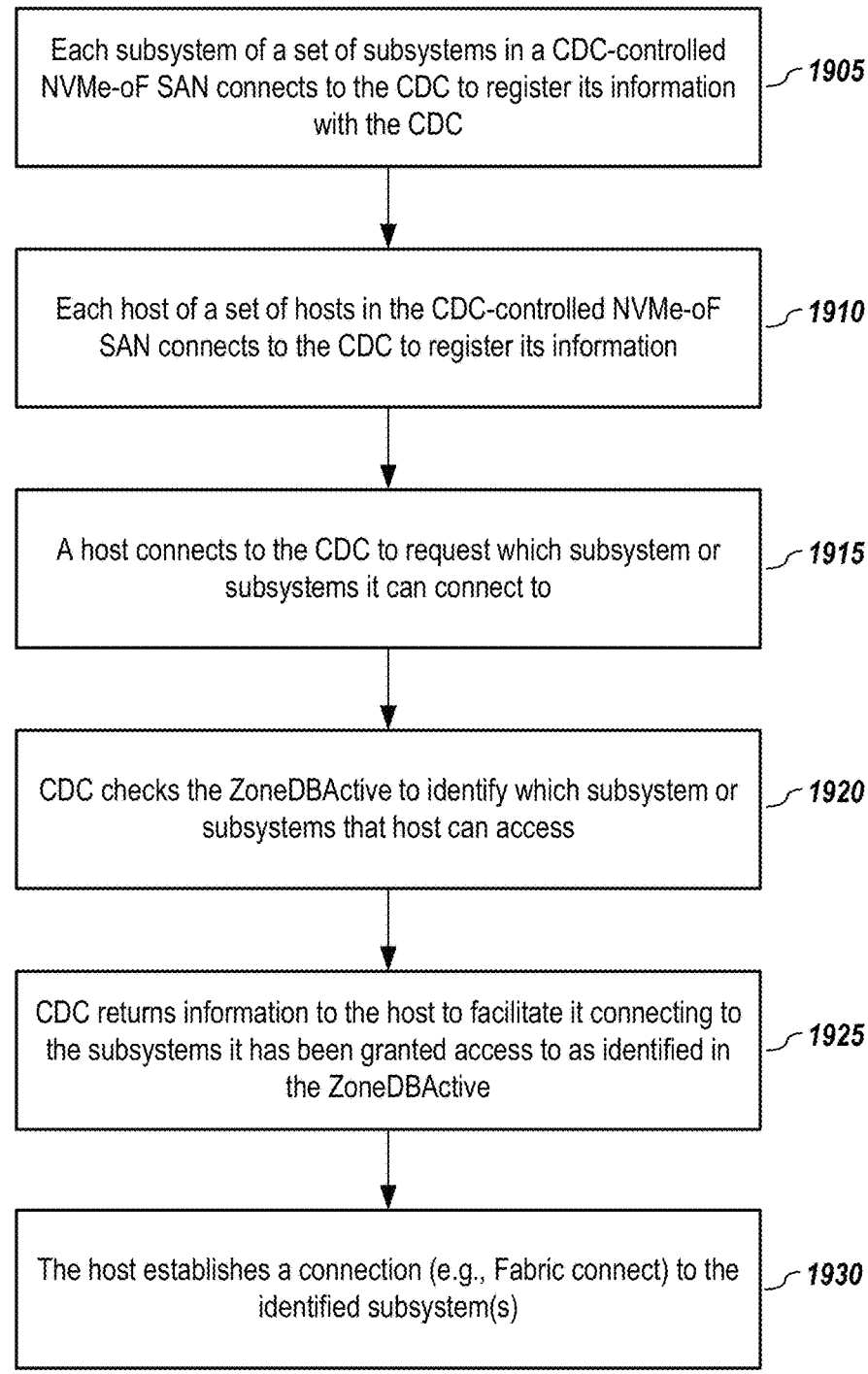
FIG. 19 depicts a method for implementing or enforcing a zone group, according to embodiments of the present disclosure.
Figure 20:
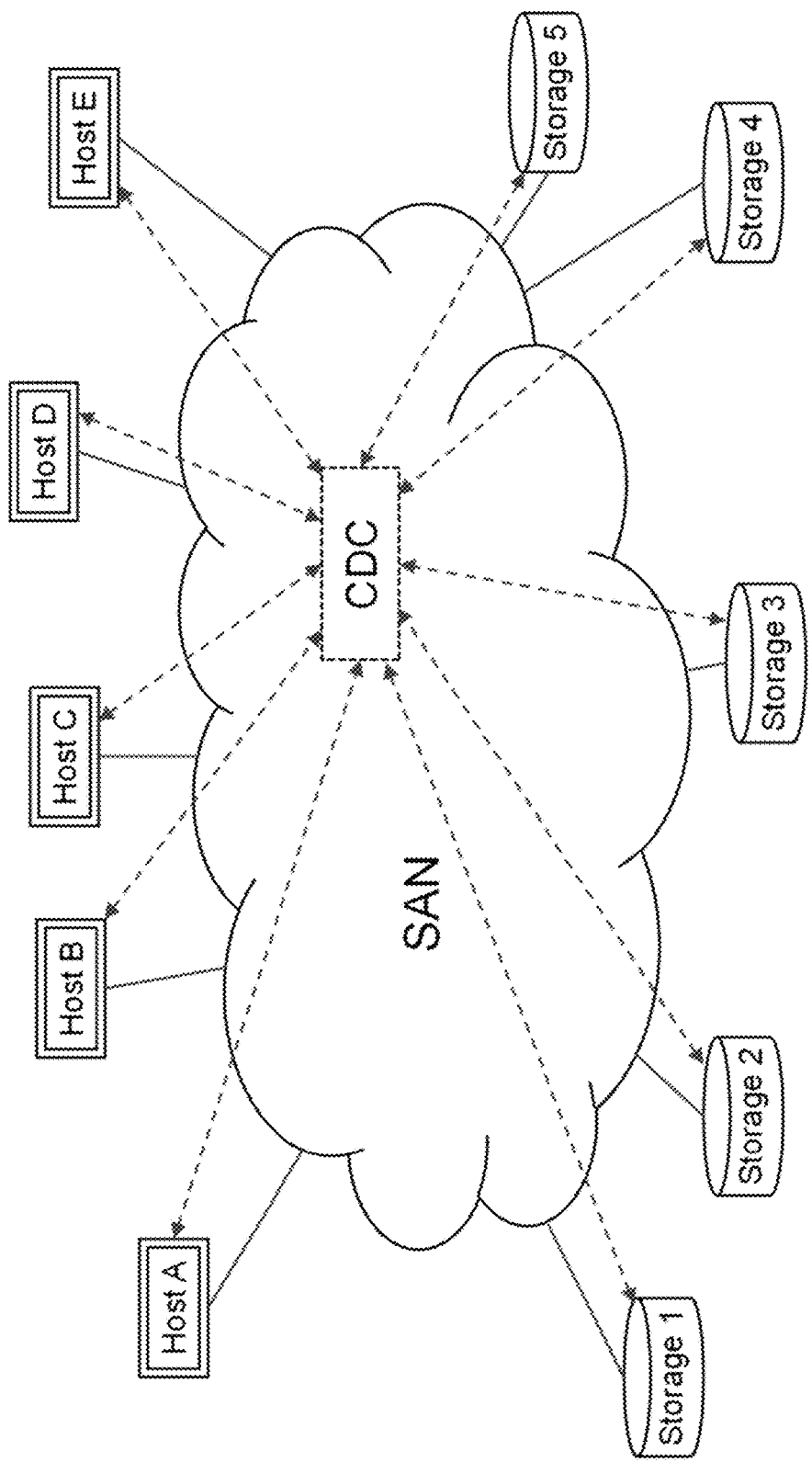
FIG. 20 depicts the logical connections between the hosts and the subsystems and the CDC, according to embodiments of the present disclosure.

FIG. 19 depicts a method for implementing or enforcing a zone group, according to embodiments of the present disclosure. In one or more embodiments, each subsystem of a set of subsystems in a CDC-controlled NVMe-oF SAN connects (1905) to the CDC to register its information with the CDC. Additionally, in one or more embodiments, each host of a set of hosts in the CDC-controlled NVMe-oF SAN connects (1910) to the CDC to register its information. FIG. 20 depicts the logical connections between the hosts and the subsystems and the CDC, according to embodiments of the present disclosure.

Examples of a CDC and of registration (e.g., explicit registration, implicit registration, or both) are disclosed in co-pending and commonly-owned U.S. patent application Ser. No. 16/898,216, filed on 10 Jun. 2020, entitled "IMPLICIT DISCOVERY CONTROLLER REGISTRATION OF NON-VOLATILE MEMORY EXPRESS (NVME) ELEMENTS IN AN NVME-OVER-FABRICS (NVME-OF)," and listing Erik Smith, Joseph White, David Black, and Raja Subbiah as inventors, which patent application is a continuation-in-part of and claims priority benefit under 35 USC § 120 to co-pending and commonly-owned U.S. patent application Ser. No. 16/898,191, filed on 10 Jun. 2020, entitled "TARGET DRIVEN ZONING FOR ETHERNET IN NON-VOLATILE MEMORY EXPRESS OVER-FABRICS (NVME-OF) ENVIRONMENTS," and listing Erik Smith, Joseph White, David Black, and Raja Subbiah as inventors, which patent application: (1) is a continuation-in-part of and claims priority benefit under 35 USC § 120 to co-pending and commonly-owned U.S. patent application Ser. No. 16/820,547, filed on 16 Mar. 2020, entitled "DISCOVERY CONTROLLER REGISTRATION OF NON-VOLATILE MEMORY EXPRESS (NVMe) ELEMENTS IN AN NVMe-OVER-FABRICS (NVMe-oF) SYSTEM," and listing Erik Smith, Joseph White, David Black, and Raja Subbiah as inventors; and (2) claims priority to and the benefit of under 35 USC § 119 the provisional patent application entitled "TARGET DRIVEN ZONING FOR ETHERNET IN NON-VOLATILE MEMORY EXPRESS OVER-FABRICS (NVME-OF) ENVIRONMENTS," Indian Patent Application Number 202011017755, filed in the Indian Patent Office on 25 Apr. 2020. Each of the aforementioned patent applications is incorporated by reference herein in its entirety and for all purposes.

Figure 21:
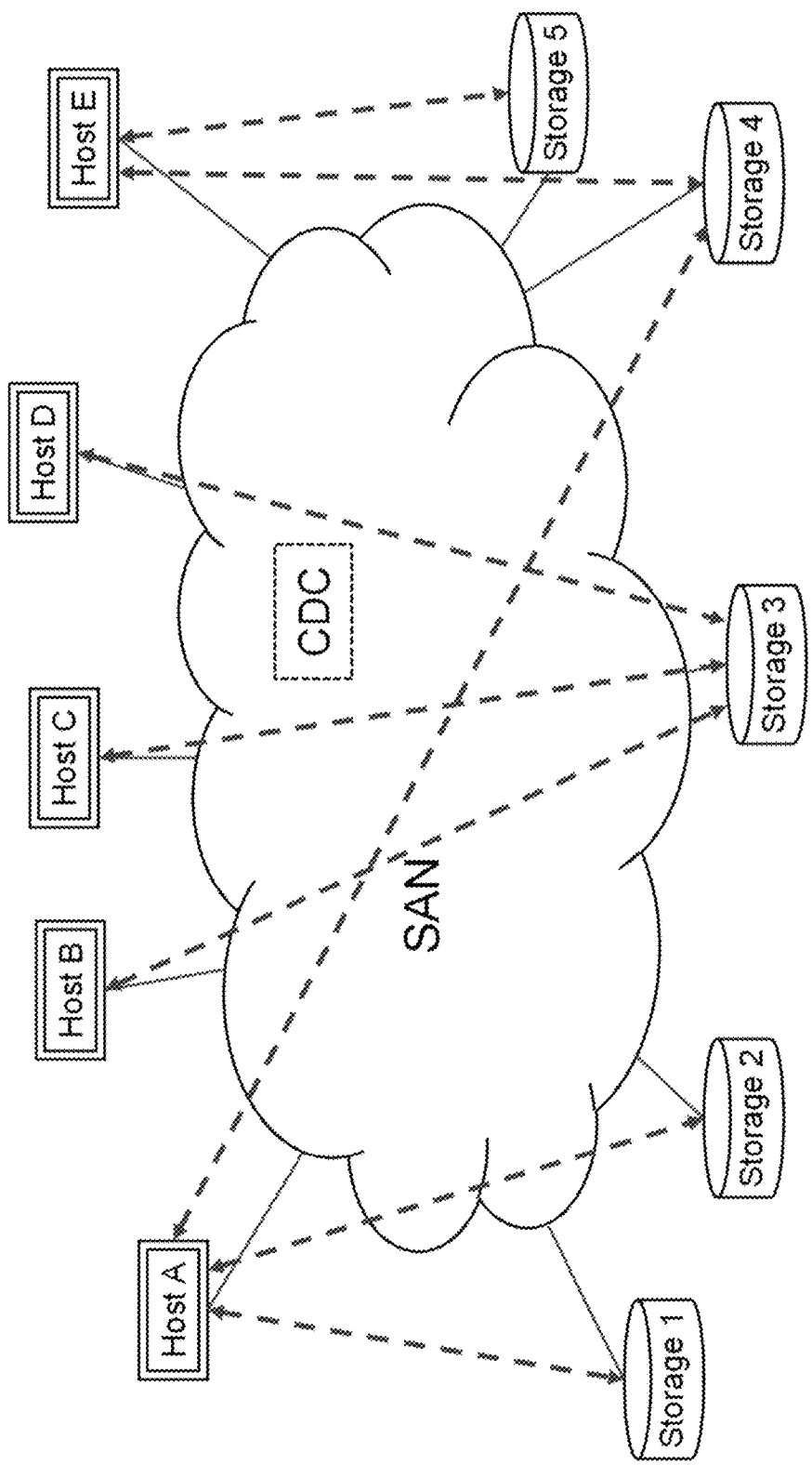
FIG. 21 shows the logical connections made between the hosts and the subsystems if the zone groups of FIG. 15 were implemented, according to embodiments of the present disclosure.

In one or more embodiments, a host connects (1915) to the CDC to request information (e.g., Get Log Page request) regarding which subsystem or subsystems it can connect to. In response to receiving the request, the CDC checks (1920) the zone active database (ZoneDBActive) to identify via the active zone groups which subsystem or subsystems that host can access, and the CDC returns (1925) information to the host to facilitate it connecting to the subsystem(s) it has been granted access to as identified by the zone group(s) in the ZoneDBActive. With the returned information, the host establishes a connection (e.g., using a Fabric connect command) to the identified subsystem or subsystems. FIG. 21 shows the logical connections made between the hosts and the subsystems if the zone groups of FIG. 15 were implemented. Note that there are multiple zone groups that are activated. As noted previously, an additional benefit of the embodiments of the present patent document is that a zone group may be added, removed, or altered without affecting the other active zone groups.

F. System Embodiments

In one or more embodiments, aspects of the present patent document may be directed to, may include, or may be implemented on one or more information handling systems (or computing systems). An information handling system/ computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 22:
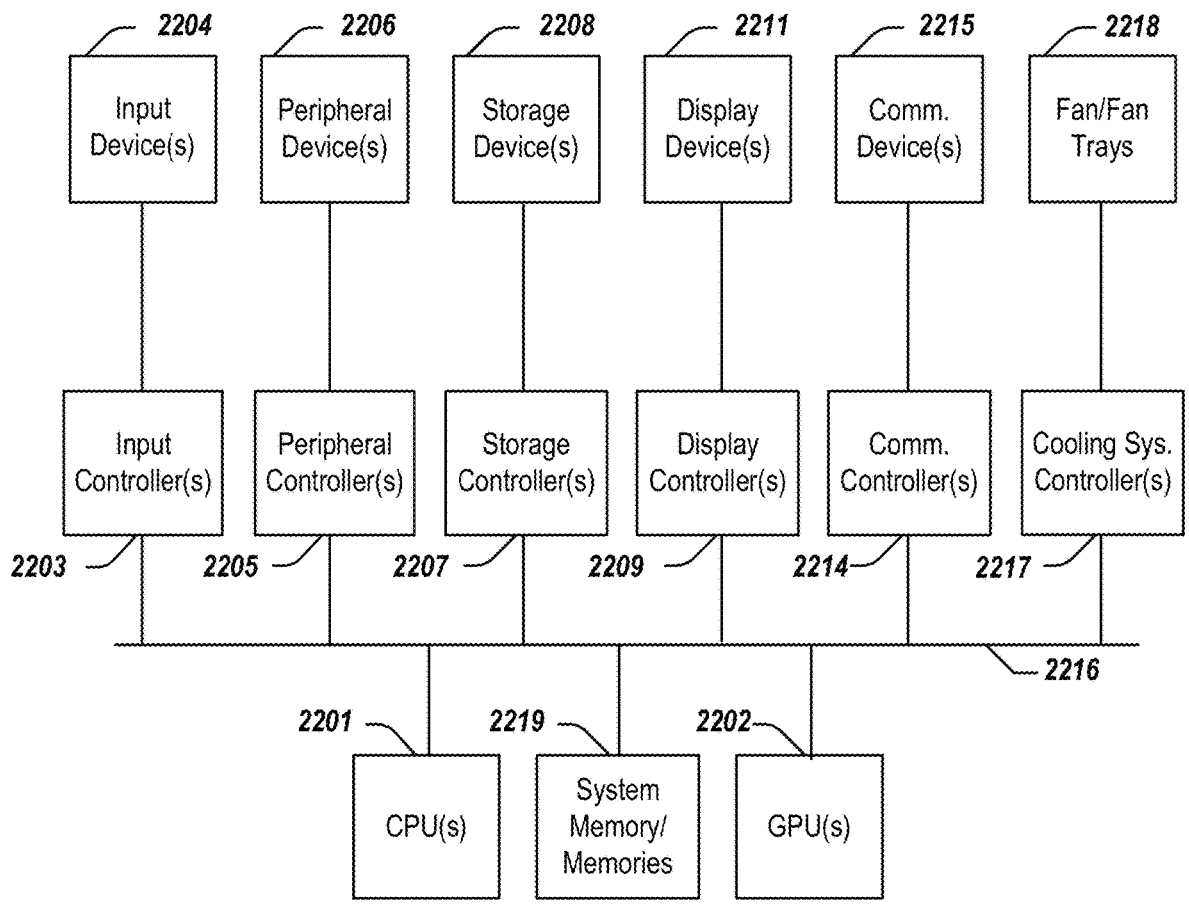
FIG. 22 depicts a simplified block diagram of an information handling system, according to embodiments of the present disclosure.

FIG. 22 depicts a simplified block diagram of an information handling system (or computing system), according to embodiments of the present disclosure. It will be understood that the functionalities shown for system 2200 may operate to support various embodiments of a computing system—although it shall be understood that a computing system may be differently configured and include different components, including having fewer or more components as depicted in FIG. 22.

As illustrated in FIG. 22, the computing system 2200 includes one or more central processing units (CPU) 2201 that provides computing resources and controls the computer. CPU 2201 may be implemented with a microprocessor or the like and may also include one or more graphics processing units (GPU) 2202 and/or a floating-point coprocessor for mathematical computations. In one or more embodiments, one or more GPUs 2202 may be incorporated within the display controller 2209, such as part of a graphics card or cards. The system 2200 may also include a system memory 2219, which may comprise RAM, ROM, or both.

A number of controllers and peripheral devices may also be provided, as shown in FIG. 22. An input controller 2203 represents an interface to various input device(s) 2204, such as a keyboard, mouse, touchscreen, and/or stylus. The computing system 2200 may also include a storage controller 2207 for interfacing with one or more storage devices 2208 each of which includes a storage medium such as magnetic tape or disk, or an optical medium that might be used to record programs of instructions for operating systems, utilities, and applications, which may include embodiments of programs that implement various aspects of the present disclosure. Storage device(s) 2208 may also be used to store processed data or data to be processed in accordance with the disclosure. The system 2200 may also include a display controller 2209 for providing an interface to a display device 2211, which may be a cathode ray tube (CRT) display, a thin film transistor (TFT) display, organic light-emitting diode, electroluminescent panel, plasma panel, or any other type of display. The computing system 2200 may also include one or more peripheral controllers or interfaces 2205 for one or more peripherals 2206. Examples of peripherals may include one or more printers, scanners, input devices, output devices, sensors, and the like. A communications controller 2214 may interface with one or more communication devices 2215, which enables the system 2200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2200 comprises one or more fans or fan trays 2218 and a cooling subsystem controller or controllers 2217 that monitors thermal temperature(s) of the system 2200 (or components thereof) and operates the fans/fan trays 2218 to help regulate the temperature.

In the illustrated system, all major system components may connect to a bus 2216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 23:
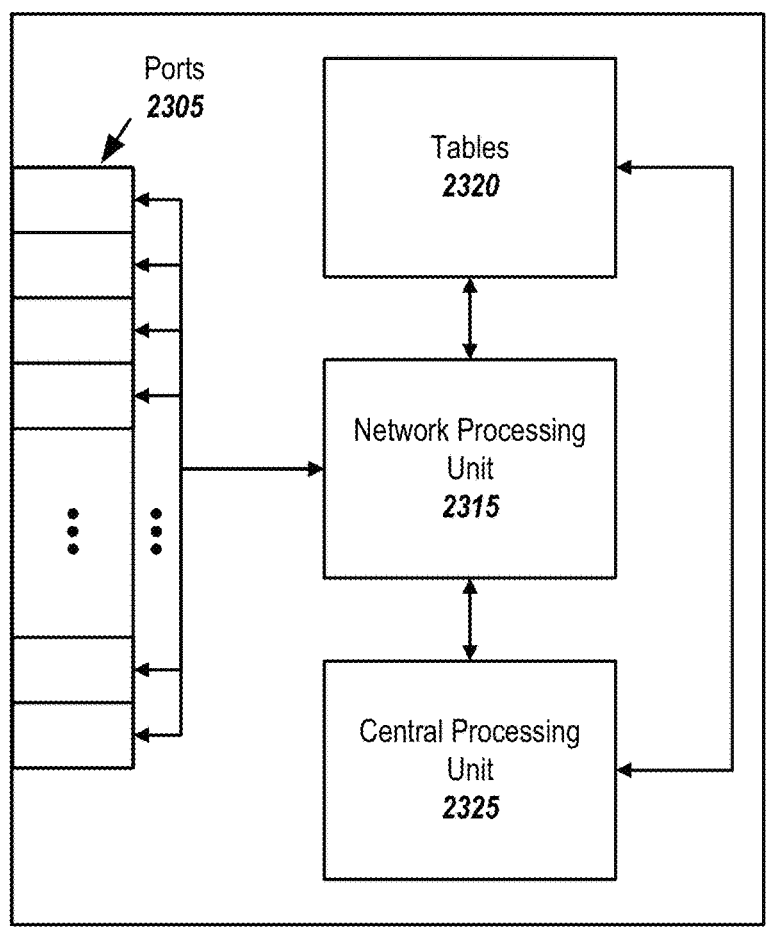
FIG. 23 depicts an alternative block diagram of an information handling system, according to embodiments of the present disclosure.

FIG. 23 depicts an alternative block diagram of an information handling system, according to embodiments of the present disclosure. It will be understood that the functionalities shown for system 2300 may operate to support various embodiments of the present disclosure—although it shall be understood that such system may be differently configured and include different components, additional components, or fewer components.

The information handling system 2300 may include a plurality of I/O ports 2305, a network processing unit (NPU) 2315, one or more tables 2320, and a central processing unit (CPU) 2325. The system includes a power supply (not shown) and may also include other components, which are not shown for sake of simplicity.

In one or more embodiments, the I/O ports 2305 may be connected via one or more cables to one or more other network devices or clients. The network processing unit 2315 may use information included in the network data received at the node 2300, as well as information stored in the tables 2320, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
   for each zone group of a set of zone groups, receiving a zone group dataset at a centralized discovery controller (CDC) of a non-volatile memory express (NVMe) over Fabric (NVMe-oF) storage area network (SAN), wherein a zone group dataset represents a set of access control rules enforceable by the CDC;
   responsive to the zone group being set to be active, storing the zone group dataset in an active zone group database of the CDC, in which each zone group dataset stored in the active zone group database is eligible to be enforced in the NVMe-oF SAN;
   responsive to receiving a request from a host for information about which storage subsystems in the NVMe-oF SAN that the host is allowed to access, searching the active zone group database for each zone of which the host is identified as a member; and
   responsive to identifying one or more zones of which the host is identified as a member, transmitting to the host information about the storage subsystem or storage subsystems that the host can access for each zone of which the host is identified as a member.

2. The computer-implemented method of claim 1 wherein at least two zone groups are concurrently active in the NVMe-oF SAN.

3. The computer-implemented method of claim 1 wherein modifications or deactivation of one active zone group does not change activation status of another active zone group.

4. The computer-implemented method of claim 1 wherein each zone group is associated with an owner and the owner is granted permissions to modify, deactivate, or delete the zone group.

5. The computer-implemented method of claim 4 wherein a zone group is uniquely identified by a zone group identifier and an owner identifier.

6. The computer-implemented method of claim 1 wherein a zone group dataset comprises one or more zones and each zone comprises one or more members.

7. The computer-implemented method of claim 6 wherein each member in a zone belonging to the zone group dataset has an associated role as a host or a storage subsystem.

8. The computer-implemented method of claim 6 wherein members of a zone in the zone group dataset are subject to a set of one or more rules related to their abilities to communicate with each other relative to their roles.

9. The computer-implemented method of claim 1 further comprising:
   responsive to the zone group not being set to be active, storing the zone group dataset in a zone group configuration database of the CDC.

10. The computer-implemented method of claim 9 wherein the zone group configuration database comprises one or more zone group datasets that are not active and one or more zone alias datasets, in which a zone alias identifies a group of one or more network elements, and a zone belonging to zone group dataset that is not active comprises a zone alias as a member.

11. The computer-implemented method of claim 9 further comprising:
   responsive to the zone group dataset that comprises a zone alias as a member being moved to the active zone group database, resolving the zone alias in the zone group by identifying corresponding members of the zone alias.

12. The computer-implemented method of claim 1 wherein the information needed to create the zone group dataset is received from an administrator via an interface that directly interacts with the CDC or that directly interacts with a storage system, which in turns forwards the zone group dataset to the CDC.

13. A centralized discovery controller (CDC) system comprising:
   one or more ports for communicatively connecting with one or more hosts and one or more non-volatile memory express (NVM) subsystems of a network;
   an active zone group database for storing zone group datasets for a zone group, in which each zone group dataset stored in the active zone group database is enforced in the network;
   a zone group configuration database for storing one or more zone group datasets that are not active;
   one or more processors; and
   a non-transitory computer-readable medium or media comprising one or more sets of instructions which, when executed by at least one of the one or more processors, causes steps to be performed comprising:
      receiving a zone group dataset, wherein a zone group dataset represents a set of access control rules enforceable by the CDC;
      responsive to the zone group being set to be active, storing the zone group dataset in the active zone group database, in which each zone group dataset stored in the active zone group database is enforced in the network; and
      responsive to the zone group not being set to be active, storing the zone group dataset in the zone group configuration database.

14. The CDC system of claim 13 wherein the non-transitory computer-readable medium or media further comprises one or more sets of instructions which, when executed by at least one of the one or more processors, causes steps to be performed comprising:

receiving registration information from each of a set of NVM subsystems of the network.

15. The CDC system of claim 14 wherein the non-transitory computer-readable medium or media further comprises one or more sets of instructions which, when executed by at least one of the one or more processors, causes steps to be performed comprising:

responsive to receiving a request from a host for information about which storage subsystems in the network that the host is allowed to access, searching the active zone group database for each zone of which the host is identified as a member; and responsive to identifying one or more zones of which the host is identified as a member, transmitting to the host information about the NVM subsystem or subsystems that it can access.

16. The CDC system of claim 13 wherein a zone group is associated with an owner and the zone group is uniquely identified by a zone group identifier and an owner identifier.

17. A non-transitory computer-readable medium or media comprising one or more sequences of instructions which, when executed by at least one processor, causes steps to be performed comprising:

for each zone group of a set of zone groups, receiving a zone group dataset at a centralized discovery controller (CDC) of a non-volatile memory express over Fabric (NVMe-oF) storage area network (SAN), wherein a zone group dataset represents a set of access control rules enforceable by the CDC;

responsive to the zone group being set to be active, storing the zone group dataset in an active zone group database of the CDC, in which each zone group dataset stored in the active zone group database is enforced in the NVMe-oF SAN;

responsive to receiving a request from a host for information about which storage subsystems in the NVMe-oF SAN that the host is allowed to access, searching the active zone group database for each zone of which the host is identified as a member; and responsive to identifying one or more zones of which the host is identified as a member, transmitting to the host information about the storage subsystem or storage subsystems that the host can access for each zone of which the host is identified as a member.

18. The non-transitory computer-readable medium or media of claim 17 wherein a zone group is associated with an owner and the zone group is uniquely identified by a zone group identifier and an owner identifier.

19. The non-transitory computer-readable medium or media of claim 17 wherein a zone group dataset comprises one or more zones and each zone comprises one or more members and wherein for members of a zone in the zone group dataset are subject to a set of one or more rules related to their abilities to communicate with each other relative to their roles.

20. The non-transitory computer-readable medium or media of claim 17 further comprising one or more sequences of instructions which, when executed by at least one processor, causes steps to be performed comprising:

responsive to the zone group not being set to be active, storing the zone group dataset in a zone group configuration database of the CDC.

* * * * *